(12) United States Patent
Wang

(10) Patent No.: US 10,295,701 B2
(45) Date of Patent: May 21, 2019

(54) PORTABLE ELECTRONIC DEVICE AND OPTICAL PROXIMITY SENSOR MODULE THEREOF HAVING INCLINED SURFACE DISPOSED ABOVE LIGHT-SENSING AREA

(71) Applicant: LITE-ON SINGAPORE PTE. LTD., Midview (SG)

(72) Inventor: You-Fa Wang, Singapore (SG)

(73) Assignee: LITE-ON SINGAPORE PTE. LTD., Midview (SG)

( * ) Notice: Subject to any disclaimer, the term of this patent is extended or adjusted under 35 U.S.C. 154(b) by 181 days.

(21) Appl. No.: 15/491,146

(22) Filed: Apr. 19, 2017

(65) Prior Publication Data
US 2018/0143346 A1 May 24, 2018

(30) Foreign Application Priority Data
Nov. 18, 2016 (CN) .......................... 2016 1 1028261

(51) Int. Cl.
*G01V 8/12* (2006.01)
*G06F 3/03* (2006.01)

(52) U.S. Cl.
CPC .............. *G01V 8/12* (2013.01); *G06F 3/0304* (2013.01)

(58) Field of Classification Search
CPC .......... G01V 8/12; G01V 8/20; G06F 1/1626; G06F 3/0304; G06F 1/1684; G06F 1/3265; G06F 1/3231; G06F 1/1637; G01S 17/08; H04M 1/0266; G01J 1/42
See application file for complete search history.

(56) References Cited

U.S. PATENT DOCUMENTS

| | | | | |
|---|---|---|---|---|
| 6,246,859 B1* | 6/2001 | Takemura | ................ | B65H 7/04 250/227.11 |
| 2003/0094566 A1* | 5/2003 | Hamalainen | ............. | G01V 8/14 250/221 |
| 2012/0223231 A1* | 9/2012 | Nijaguna | ............... | G01J 1/0214 250/338.1 |
| 2013/0292705 A1* | 11/2013 | Makimura | ........ | H01L 31/02164 257/81 |

(Continued)

*Primary Examiner* — Thanh Luu
*Assistant Examiner* — Jennifer D Bennett
(74) *Attorney, Agent, or Firm* — Li & Cai Intellectual Property (USA) Office

(57) ABSTRACT

The present disclosure provides a portable electronic device and an optical proximity sensor module thereof. The optical proximity sensor module includes a circuit substrate, a light-emitting element, an optical proximity sensor element, a light-transmitting package structure and a light-shielding structure. The light-emitting element and the optical proximity sensor element are disposed on the circuit substrate. The light-transmitting package structure includes a first package body disposed on the circuit substrate to enclose the light-emitting element and a second package body disposed on the circuit substrate to enclose the optical proximity sensor element. The light-shielding structure is disposed on the light-transmitting package structure to enclose one part of the first package body and one part of the second package body. The second package body has a second exposed surface exposed from the light-shielding structure, and the second exposed surface has an inclined surface disposed above the optical proximity sensor element.

8 Claims, 7 Drawing Sheets

(56) References Cited

U.S. PATENT DOCUMENTS

| | | | |
|---|---|---|---|
| 2013/0292706 A1* | 11/2013 | Costello | H01L 31/167 257/82 |
| 2014/0084145 A1* | 3/2014 | Guan | G01S 7/4813 250/216 |
| 2016/0061653 A1* | 3/2016 | Chang | H01L 31/167 250/237 R |
| 2018/0045827 A1* | 2/2018 | Yoon | G06F 3/0421 |

* cited by examiner

PORTABLE ELECTRONIC DEVICE AND OPTICAL PROXIMITY SENSOR MODULE THEREOF HAVING INCLINED SURFACE DISPOSED ABOVE LIGHT-SENSING AREA

BACKGROUND OF THE INVENTION

1. Field of the Invention

The present disclosure relates to an electronic device and a sensor module thereof, and more particularly to a portable electronic device and an optical proximity sensor module thereof.

2. Description of Related Art

In recent years, proximity sensors and ambient light sensors have been widely used in devices such as mobile phones, TVs, and portable mobile devices to detect the presence of users or to automatically adjust screen brightness in accordance with the intensity of ambient light. For instance, a proximity sensor can be applied to a handheld communication device to measure the distance between a user's face and a display screen. With the distance between the user's face and the display screen measured, the display screen can automatically lock itself when the measured distance indicates that the user is not using the display screen, thereby extending the battery life. Another application of the measured distance is to enable a touch screen to automatically lock itself when it is detected that the face of a user is getting closer to the touch screen, so that accidental touching of the user's face to the screen can be prevented. However, the conventional proximity sensor needs to use an external insulation body for reducing crosstalk interference.

SUMMARY OF THE INVENTION

One aspect of the present disclosure relates to a portable electronic device and an optical proximity sensor module thereof.

One of the embodiments of the present disclosure provides an optical proximity sensor module, including a circuit substrate, a light-emitting element, an optical proximity sensor element, a light-transmitting package structure and a light-shielding structure. The light-emitting element is disposed on the circuit substrate and electrically connected to the circuit substrate. The optical proximity sensor element is disposed on the circuit substrate and electrically connected to the circuit substrate, and the optical proximity sensor element has a light-sensing area disposed on a top side thereof. The light-transmitting package structure includes a first package body disposed on the circuit substrate to enclose the light-emitting element and a second package body disposed on the circuit substrate to enclose the optical proximity sensor element. The light-shielding structure is disposed on the light-transmitting package structure to enclose one part of the first package body and one part of the second package body. The first package body has a first exposed surface exposed from the light-shielding structure, the second package body has a second exposed surface exposed from the light-shielding structure, and the second exposed surface has an inclined surface disposed above the light-sensing area of the optical proximity sensor element.

Another one of the embodiments of the present disclosure provides a portable electronic device using an optical proximity sensor module, characterized in that the optical proximity sensor module comprises a circuit substrate, a light-emitting element, an optical proximity sensor element, a light-transmitting package structure and a light-shielding structure. The light-emitting element is disposed on the circuit substrate and electrically connected to the circuit substrate. The optical proximity sensor element is disposed on the circuit substrate and electrically connected to the circuit substrate, and the optical proximity sensor element has a light-sensing area disposed on a top side thereof. The light-transmitting package structure includes a first package body disposed on the circuit substrate to enclose the light-emitting element and a second package body disposed on the circuit substrate to enclose the optical proximity sensor element. The light-shielding structure is disposed on the light-transmitting package structure to enclose one part of the first package body and one part of the second package body. The first package body has a first exposed surface exposed from the light-shielding structure, and the second package body has a second exposed surface exposed from the light-shielding structure. The second exposed surface has an inclined surface disposed above the light-sensing area of the optical proximity sensor element.

Therefore, the first reflected light beam can be reflected by the inclined surface of the second exposed surface to form another reflected light beam that is distant from the light-sensing area of the optical proximity sensor element due to the features of "the second package body having a second exposed surface exposed from the light-shielding structure", and "the second exposed surface having an inclined surface disposed above the light-sensing area of the optical proximity sensor element". More particularly, the inclined surface of the second exposed surface can be used to reduce the signal interferences generated by the first reflected light beam and the another reflected light beam without using any extra insulation body, so that not only the crosstalk interference generated by the first reflected light beam R1 between the light-emitting element and the optical proximity sensor element can be reduced, but also the signal to noise ratio (SNR) of light signals captured by the optical proximity sensor element can be effectively increased.

To further understand the techniques, means and effects of the present disclosure applied for achieving the prescribed objectives, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

The embodiments of a portable electronic device and an optical proximity sensor module thereof of the present disclosure are described. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

Figure 1:
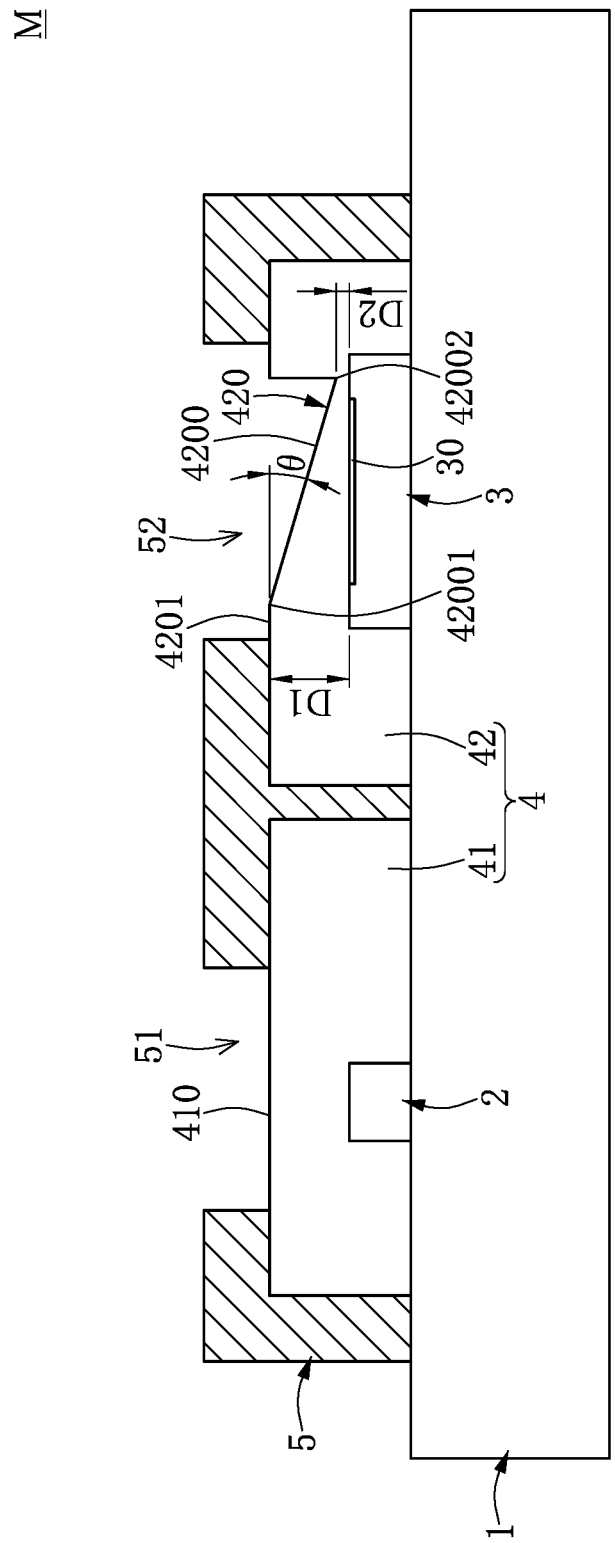
FIG. 1 shows a partial cross-sectional schematic view of an optical proximity sensor module according to one of the embodiments of the present disclosure.
Figure 2:
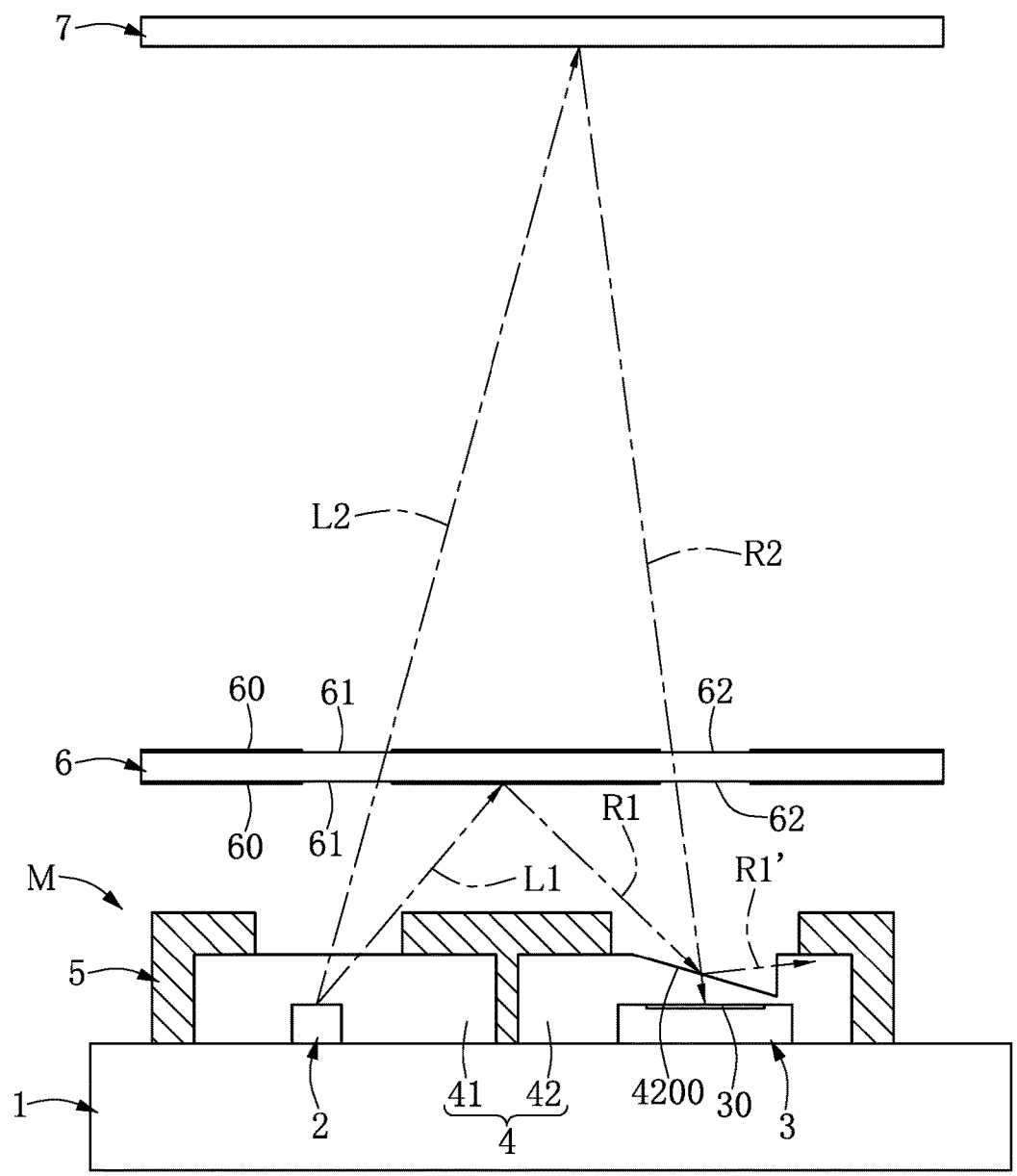
FIG. 2 shows a schematic view of the optical proximity sensor module mated with an optical element and an object according to one of the embodiments of the present disclosure.

Referring to FIG. 1 and FIG. 2, the present disclosure provides an optical proximity sensor module, including a circuit substrate 1, a light-emitting element 2, an optical proximity sensor element 3, a light-transmitting package structure 4 and light-shielding structure 5.

First, as shown in FIG. 1, the light-emitting element 2 is disposed on the circuit substrate 1 and electrically connected to the circuit substrate 1. For example, the light-emitting element 2 may be an LED chip or any type of light-emitting chip. In addition, the optical proximity sensor element 3 is disposed on the circuit substrate 1 and electrically connected to the circuit substrate 1, and the optical proximity sensor element 3 has a light-sensing area 30 disposed on a top side thereof. For example, the optical proximity sensor element 3 may be a proximity sensor (PS) or an ambient light sensor (ALS). Needless to say, the optical proximity sensor element 3 may be an optical sensor assembly including a proximity sensor or an ambient light sensor.

Moreover, as shown in FIG. 1, the light-transmitting package structure 4 includes a first package body 41 disposed on the circuit substrate 1 to enclose or cover the light-emitting element 2, and a second package body 42 disposed on the circuit substrate 1 to enclose or cover the optical proximity sensor element 3. For example, the first package body 41 and the second package body 42 are two independent encapsulation bodies spaced apart from each other, or the first package body 41 and the second package body 42 are integrated to form a single encapsulation body. In addition, both the first package body 41 and the second package body 42 are formed by a light-transmitting material such as epoxy or silicone etc.

Furthermore, as shown in FIG. 1, the light-shielding structure 5 is disposed on the light-transmitting package structure 4 to enclose or cover one part of the first package body 41 and one part of the second package body 42. More particularly, the first package body 41 has a first exposed surface 410 exposed from the light-shielding structure 5, and the second package body 42 has a second exposed surface 420 exposed from the light-shielding structure 5. The second exposed surface 420 has an inclined surface 4200 disposed above the light-sensing area 30 of the optical proximity sensor element 3. For example, the light-shielding structure 5 has a first opening 51 corresponding to the light-emitting element 2, and a second opening 52 corresponding to the optical proximity sensor element 3, so that the first exposed surface 410 of the first package body 41 and the second exposed surface 420 of the second package body 42 can be exposed by the first opening 51 and the second opening 52 of the light-shielding structure 5, respectively.

In one of the embodiments of the present disclosure, referring to FIG. 1 and FIG. 2, a first projected light beam L generated by the light-emitting element 2 can be reflected by an optical element 6 above both the light-emitting element 2 and the optical proximity sensor element 3 to form a first reflected light beam R1 that is projected onto the inclined surface 4200 of the second exposed surface 420, and the first reflected light beam R1 can be reflected by the inclined surface 4200 of the second exposed surface 420 to form another reflected light beam R1' that is distant from the light-sensing area 30 of the optical proximity sensor element 3. Moreover, a second projected light beam L2 generated by the light-emitting element 2 can pass through the optical element 6 and can be reflected by an object 7 above the optical element 6 to form a second reflected light beam R2 that is projected onto the inclined surface 4200 of the second exposed surface 420, and the second reflected light beam R2 can pass the inclined surface 4200 of the second exposed surface 420 and can be projected onto the light-sensing area 30 of the optical proximity sensor element 3.

It should be noted that an outer surface of the optical element 6 has a light-shielding area 60, a first non-light-shielding area 61 and a second non-light-shielding area 62, and the first non-light-shielding area 61 and the second non-light-shielding area 62 are spaced apart from each other by a predetermined distance as shown in FIG. 2. For example, the light-shielding area 60 can be formed by coating an opaque material on the outer surface of the optical element 6, and the first non-light-shielding area 61 and the second non-light-shielding area 62 are two separated areas uncoated by the opaque material. The light-shielding area 60 of the optical element 6 can be used as a mirror, so that the first projected light beam L generated by the light-emitting element 2 can be reflected by the light-shielding area 60 of the optical element 6 to form the first reflected light beam R1. In addition, the first non-light-shielding area 61 and the second non-light-shielding area 62 of the optical element 6 can be used as two light-transmitting windows, so that the second projected light beam L2 generated by the light-emitting element 2 can be projected onto the object 7 through the first non-light-shielding area 61 of the optical element 6, and the second reflected light beam R2 can be projected onto the light-sensing area 30 of the optical proximity sensor element 3 through the second non-light-shielding area 62 of the optical element 6.

It should be noted that the second reflected light beam R2 is a diffuse reflection as shown in FIG. 2. In addition, the second non-light-shielding area 62 of the optical element 6 has a predetermined width, so that the second reflected light beam R2 within an incidence angle range can be projected onto the inclined surface 4200 of the second exposed surface 420 through the second non-light-shielding area 62 of the optical element 6. Hence, it should be obvious that an incidence angle of the second reflected light beam R2 projected onto the inclined surface 4200 is smaller than an incidence angle of the first reflected light beam R1 projected onto the inclined surface 4200. That is to say, it is easier for the second reflected light beam R2 than the first reflected light beam R1 to pass through the inclined surface 4200 of the second exposed surface 420 and be projected onto the light-sensing area 30 of the optical proximity sensor element 3. Therefore, not only can the crosstalk interference generated by the first reflected light beam R1 between the light-emitting element 2 and the optical proximity sensor element 3 be reduced, but the signal to noise ratio (SNR) of light signals captured by the optical proximity sensor element 3 can also be increased effectively.

Figure 3:
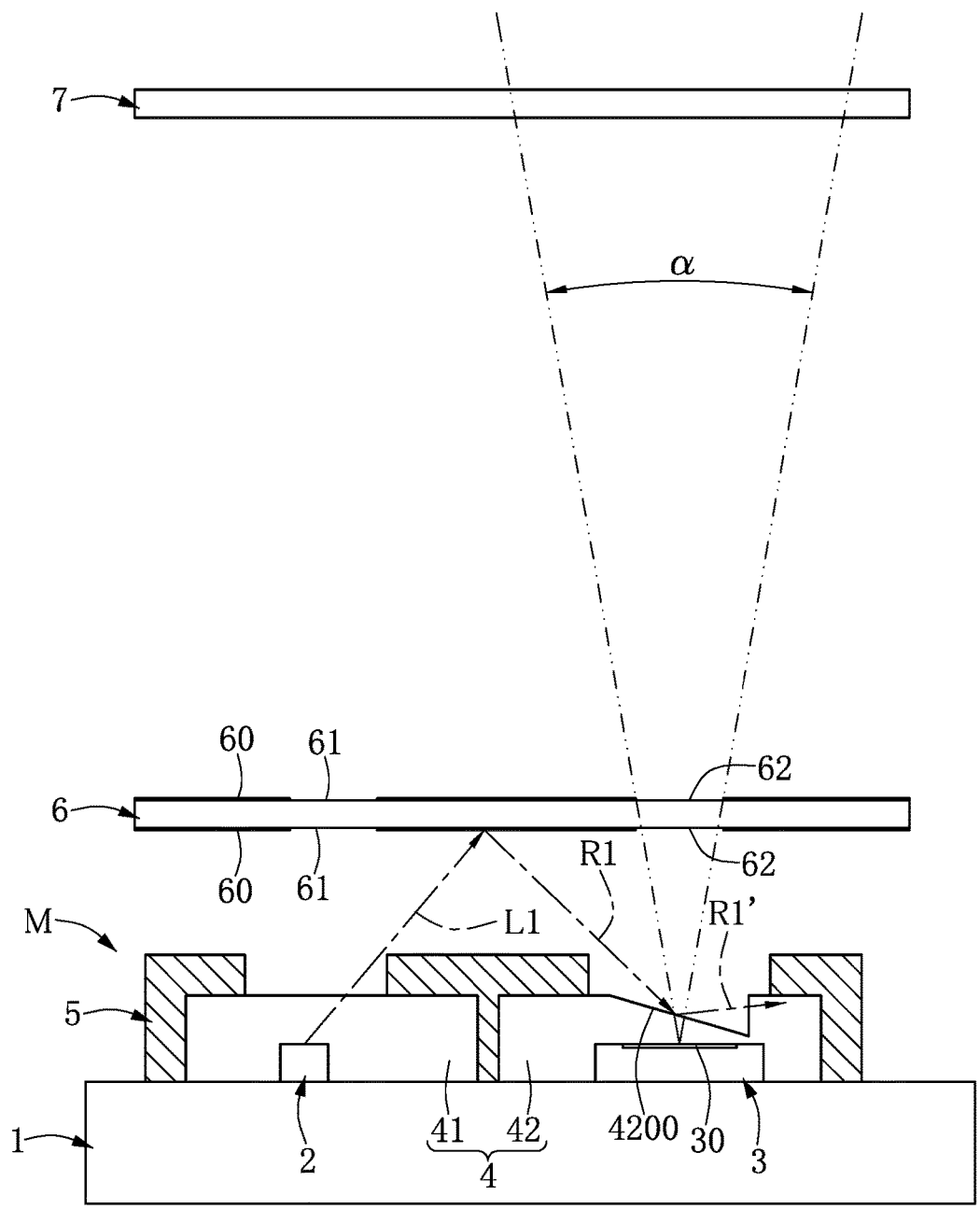
FIG. 3 shows a schematic view of a second reflected light beam within an incidence angle range projected onto the inclined surface through the second non-light-shielding area according to one of the embodiments of the present disclosure.

Hence, referring to FIG. 1 to FIG. 3, the inclined surface 4200 of the second exposed surface 420 can be used to reduce the signal interferences, e.g. crosstalk interference, generated by the first reflected light beam R1 and the another reflected light beam R1' without using any extra insulation body, so that not only the crosstalk interference generated by the first reflected light beam R1 between the light-emitting element 2 and the optical proximity sensor element 3 can be reduced, but also the signal to noise ratio (SNR) of light signals captured by the optical proximity sensor element 3 can be increased effectively.

Figure 4:
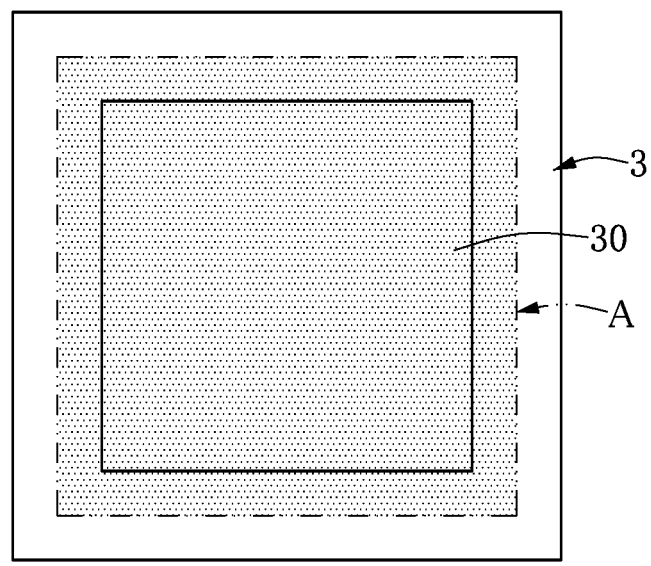
FIG. 4 shows a schematic view of a light-sensing area of the optical proximity sensor element and a vertical projection area of the inclined surface according to one of the embodiments of the present disclosure.

For example, referring to FIG. 1 and FIG. 2, the second exposed surface 420 has a top surface 4201, and the inclined surface 4200 is inclined downwardly relative to the top surface 4201 by a predetermined angle θ substantially between 15 and 45 degrees. In addition, the inclined surface 4200 has a first end 42001 adjacent to the light-emitting element 2 and a second end 42002 opposite to the first end 42001 and distant from the light-emitting element 2, with a first distance D1 from the first end 42001 of the inclined surface 4200 to the top side of the optical proximity sensor element 3 being larger than a second distance D2 from the second end 42002 of the inclined surface 4200 to the top side of the optical proximity sensor element 3. It should be noted that the light-sensing area 30 of the optical proximity sensor element 3 is smaller than a vertical projection area A of the inclined surface 4200 projected onto the top side of the optical proximity sensor element 3 as shown in FIG. 1 and FIG. 4, so as to ensure that the first reflected light beam R1 can be reflected by the inclined surface 4200 of the second exposed surface 420 to form the another reflected light beam R1' that is distant from the light-sensing area 30 of the optical proximity sensor element 3.

Figure 5:
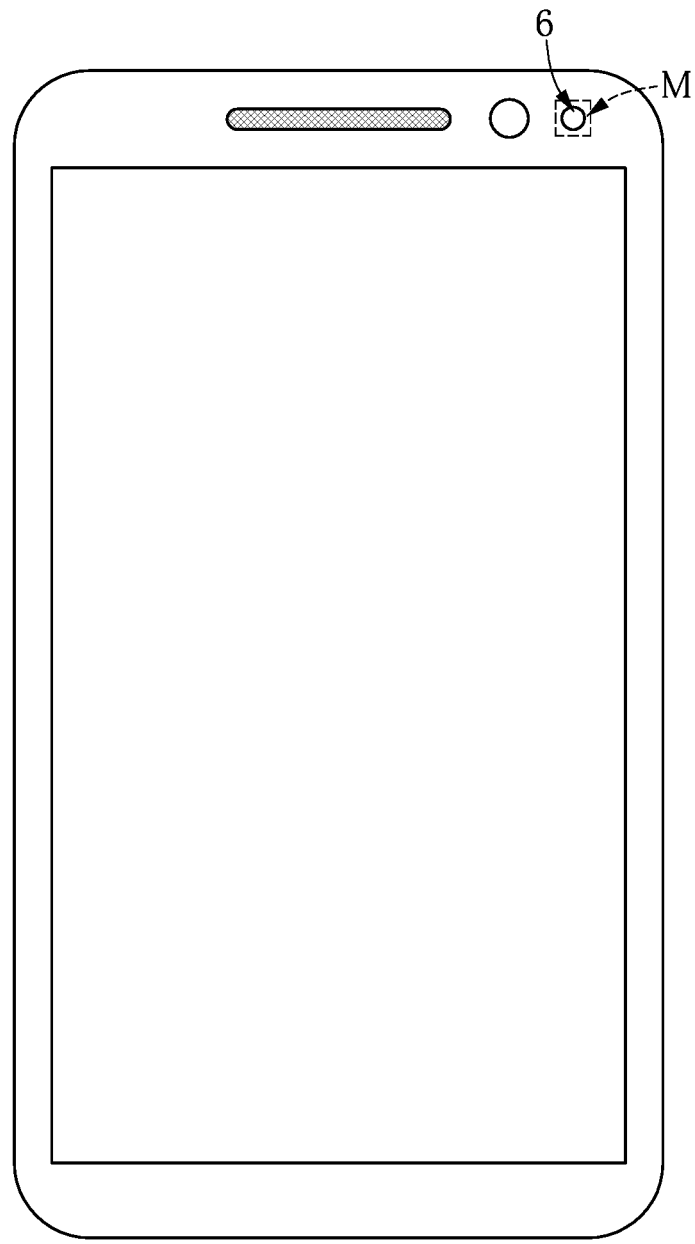
FIG. 5 shows a schematic view of the portable electronic device using an optical proximity sensor module according to the present disclosure.

More particularly, as shown in FIG. 5, the present disclosure further provides a portable electronic device P using an optical proximity sensor module M. Referring to FIG. 1 and FIG. 5, the optical proximity sensor module M includes a circuit substrate 1, a light-emitting element 2, an optical proximity sensor element 3, a light-transmitting package structure 4 and a light-shielding structure 5. Hence, the optical proximity sensor module M provided by the present disclosure can be applied to any type of portable electronic device P such as a smart phone or a tablet computer, etc.

Figure 6:
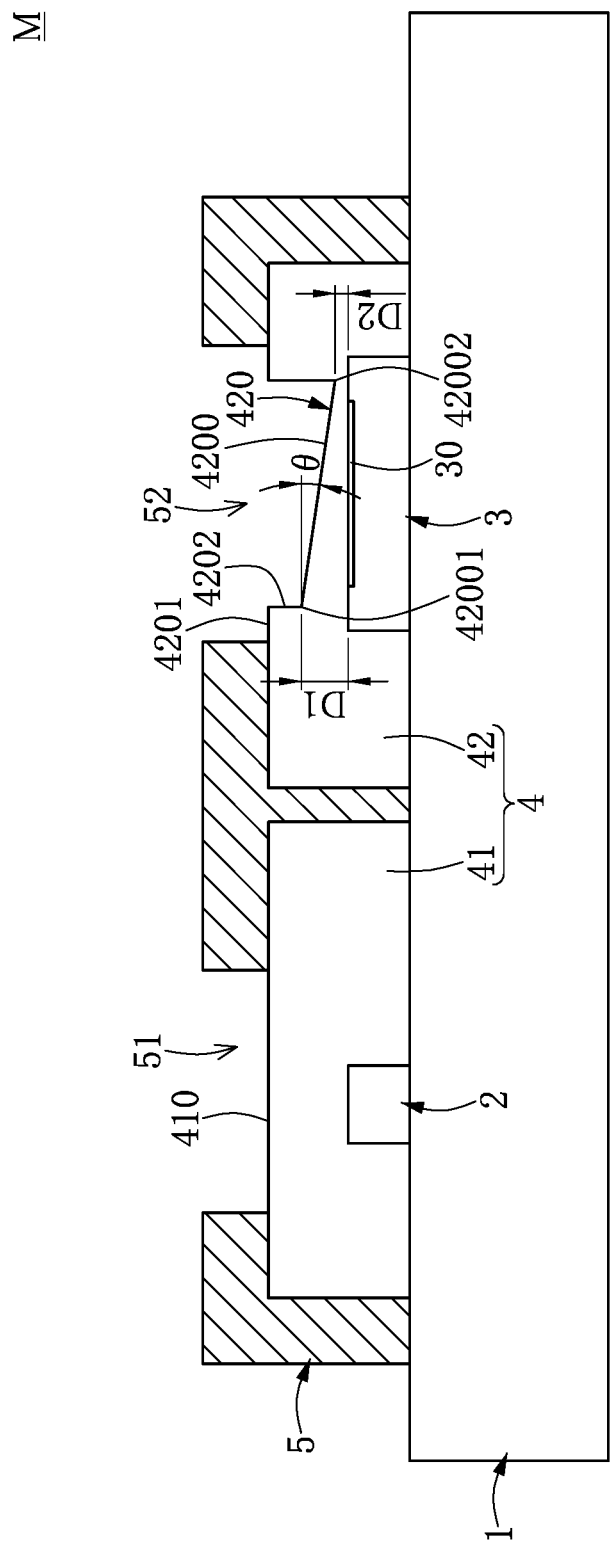
FIG. 6 shows a partial cross-sectional schematic view of the optical proximity sensor module according to another one of the embodiments of the present disclosure.
Figure 7:
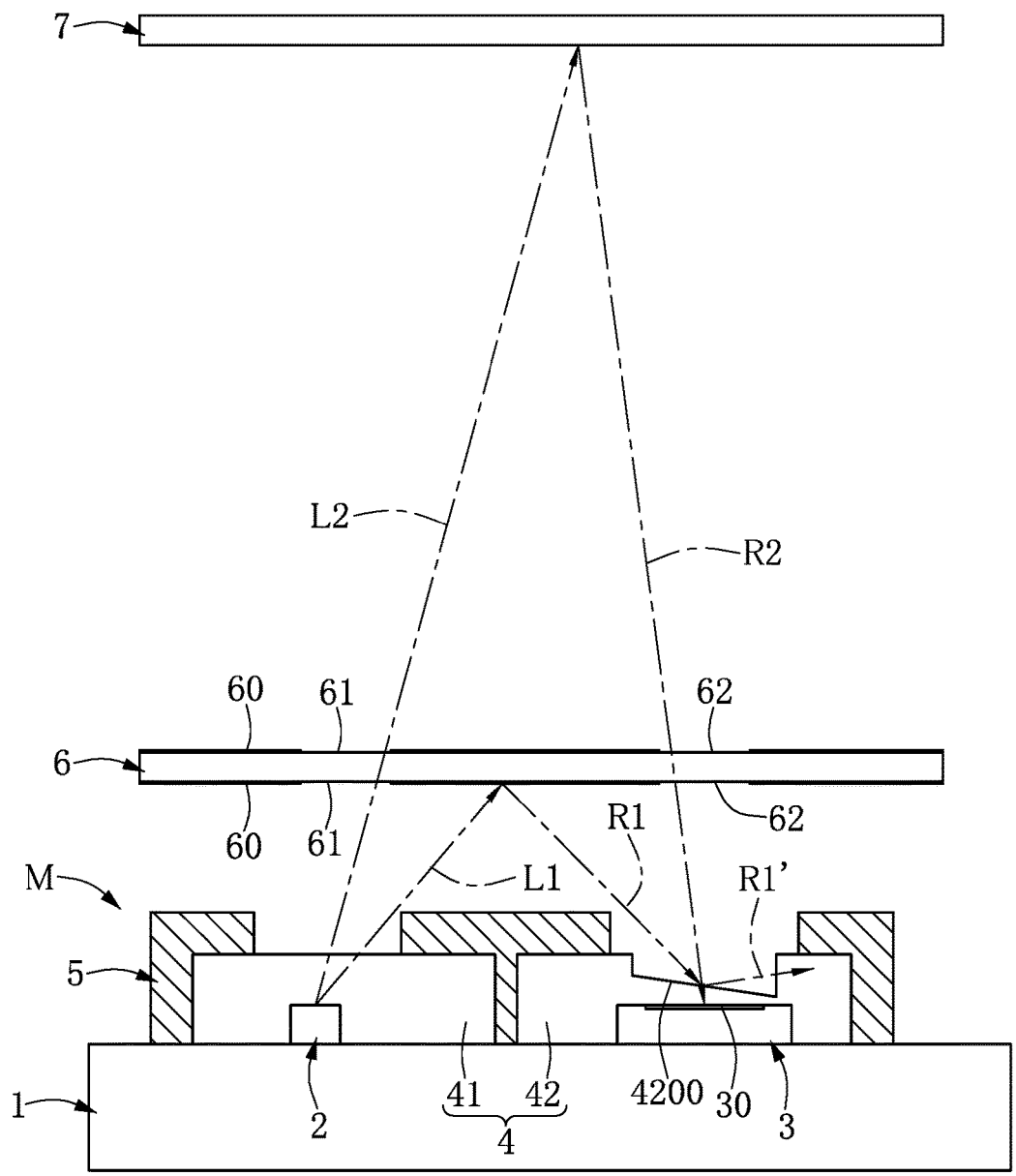
FIG. 7 shows a schematic view of the optical proximity sensor module mated with an optical element and an object according to another one of the embodiments of the present disclosure.

In another one of the embodiments of the present disclosure, referring to FIG. 6 and FIG. 7, a first projected light beam L generated by the light-emitting element 2 can be reflected by an optical element 6 above both the light-emitting element 2 and the optical proximity sensor element 3 to form a first reflected light beam R1 that is projected onto another inclined surface 4200 of the second exposed surface 420, and the first reflected light beam R1 can be reflected by the another inclined surface 4200 of the second exposed surface 420 to form another reflected light beam R1' that is distant from the light-sensing area 30 of the optical proximity sensor element 3. Moreover, a second projected light beam L2 generated by the light-emitting element 2 can pass through the optical element 6 and can be reflected by an object 7 above the optical element 6 to form a second reflected light beam R2 that is projected onto the another inclined surface 4200 of the second exposed surface 420. The second reflected light beam R2 can pass the another inclined surface 4200 of the second exposed surface 420 and can be projected onto the light-sensing area 30 of the optical proximity sensor element 3.

More particularly, as shown in FIG. 6, the second exposed surface 420 has a top surface 4201 and a lateral surface 4202 extended downwardly from the top surface 4201, and the another inclined surface 4200 is inclined downwardly from the lateral surface 4202 by a predetermined angle θ substantially between 15 and 45 degrees. That is to say, the inclined surface 4200 can be inclined downwardly from the top surface 4201 of the second exposed surface 420 as shown in FIG. 1, or the another inclined surface 4200 can be inclined downwardly from the lateral surface 4202 of the second exposed surface 420 as shown in FIG. 6, according to different requirements.

It should be noted that if the inclined surface 4200 is directly extended from the top surface 4201 of the second exposed surface 420 as shown in FIG. 1, the predetermined angle θ of the inclined surface 4200 relative to the top surface 4201 of the second exposed surface 420 can have a wider range of adjustment. In addition, if the another inclined surface 4200 is directly extended from the lateral surface 4202 of the second exposed surface 420 as shown in FIG. 6, a distance from the another inclined surface 4200 to the top side of the optical proximity sensor element 3 can be decreased.

In conclusion, the first reflected light beam R1 can be reflected by the inclined surface 4200 of the second exposed surface 420 to form another reflected light beam R1' that is distant from the light-sensing area 30 of the optical proximity sensor element 3 due to the features of "the second package body 42 having a second exposed surface 420 exposed from the light-shielding structure 5", and "the second exposed surface 420 having an inclined surface 4200 disposed above the light-sensing area 30 of the optical proximity sensor element 3". Hence, the inclined surface 4200 of the second exposed surface 420 can be used to reduce the signal interferences, e.g. crosstalk interference, generated by the first reflected light beam R1 and the another reflected light beam R1' without using any extra insulation body, so that not only the crosstalk interference generated by the first reflected light beam R1 between the light-emitting element 2 and the optical proximity sensor element 3 can be reduced, but also the signal to noise ratio (SNR) of light signals captured by the optical proximity sensor element 3 can be increased effectively.

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:

1. An optical proximity sensor module, comprising:
a circuit substrate;
a light-emitting element disposed on the circuit substrate and electrically connected to the circuit substrate;
an optical proximity sensor element disposed on the circuit substrate and electrically connected to the circuit substrate, wherein the optical proximity sensor element has a light-sensing area disposed on a top side thereof;
a light-transmitting package structure including a first package body disposed on the circuit substrate to enclose the light-emitting element, and a second package body disposed on the circuit substrate to enclose the optical proximity sensor element; and
a light-shielding structure disposed on the light-transmitting package structure to enclose one part of the first package body and one part of the second package body, wherein the first package body has a first exposed surface exposed from the light-shielding structure, the second package body has a second exposed surface exposed from the light-shielding structure, and the second exposed surface has an inclined surface disposed above the light-sensing area of the optical proximity sensor element;
wherein a first projected light beam generated by the light-emitting element is reflected by an optical element above both the light-emitting element and the optical proximity sensor element to form a first reflected light beam that is projected onto the inclined surface of the second exposed surface, and the first reflected light beam is reflected by the inclined surface of the second exposed surface to form another reflected light beam that is distant from the light-sensing area of the optical proximity sensor element.

2. The optical proximity sensor module of claim 1, wherein the second exposed surface has a top surface, the inclined surface is inclined downwardly relative to the top surface by a predetermined angle, and the light-sensing area of the optical proximity sensor element is smaller than a vertical projection area of the inclined surface projected onto the top side of the optical proximity sensor element, wherein the inclined surface has a first end adjacent to the light-emitting element and a second end opposite to the first end and distant from the light-emitting element, and a first distance from the first end of the inclined surface to the top side of the optical proximity sensor element is larger than a second distance from the second end of the inclined surface to the top side of the optical proximity sensor element.

3. The optical proximity sensor module of claim 1, wherein the second exposed surface has a top surface and a lateral surface extended downwardly from the top surface, the inclined surface is inclined downwardly from the lateral surface by a predetermined angle, and the light-sensing area of the optical proximity sensor element is smaller than a vertical projection area of the inclined surface projected onto the top side of the optical proximity sensor element, wherein the inclined surface has a first end adjacent to the light-emitting element and a second end opposite to the first end and distant from the light-emitting element, and a first distance from the first end of the inclined surface to the top side of the optical proximity sensor element is larger than a second distance from the second end of the inclined surface to the top side of the optical proximity sensor element.

4. The optical proximity sensor module of claim 1, wherein a second projected light beam generated by the light-emitting element passes through the optical element and is reflected by an object above the optical element to form a second reflected light beam that is projected onto the inclined surface of the second exposed surface, and the second reflected light beam passes the inclined surface of the second exposed surface and is projected onto the light-sensing area of the optical proximity sensor element.

5. A portable electronic device using an optical proximity sensor module, characterized in that the optical proximity sensor module comprises:
a circuit substrate;
a light-emitting element disposed on the circuit substrate and electrically connected to the circuit substrate;
an optical proximity sensor element disposed on the circuit substrate and electrically connected to the circuit substrate, wherein the optical proximity sensor element has a light-sensing area disposed on a top side thereof;
a light-transmitting package structure including a first package body disposed on the circuit substrate to enclose the light-emitting element, and a second package body disposed on the circuit substrate to enclose the optical proximity sensor element; and
a light-shielding structure disposed on the light-transmitting package structure to enclose one part of the first package body and one part of the second package body, wherein the first package body has a first exposed surface exposed from the light-shielding structure, the second package body has a second exposed surface exposed from the light-shielding structure, and the second exposed surface has an inclined surface disposed above the light-sensing area of the optical proximity sensor element;
wherein a first projected light beam generated by the light-emitting element is reflected by an optical element above both the light-emitting element and the optical proximity sensor element to form a first reflected light beam that is projected onto the inclined surface of the second exposed surface, and the first reflected light beam is reflected by the inclined surface of the second exposed surface to form another reflected light beam that is distant from the light-sensing area of the optical proximity sensor element.

6. The portable electronic device of claim 5, wherein the second exposed surface has a top surface, the inclined surface is inclined downwardly relative to the top surface by a predetermined angle, and the light-sensing area of the optical proximity sensor element is smaller than a vertical projection area of the inclined surface projected onto the top side of the optical proximity sensor element, and wherein the inclined surface has a first end adjacent to the light-emitting element and a second end opposite to the first end and distant from the light-emitting element, and a first distance from the first end of the inclined surface to the top side of the optical proximity sensor element is larger than a second distance from the second end of the inclined surface to the top side of the optical proximity sensor element.

7. The portable electronic device of claim 5, wherein the second exposed surface has a top surface and a lateral surface extended downwardly from the top surface, the inclined surface is inclined downwardly from the lateral surface by a predetermined angle, and the light-sensing area of the optical proximity sensor element is smaller than a vertical projection area of the inclined surface projected onto the top side of the optical proximity sensor element, and wherein the inclined surface has a first end adjacent to the light-emitting element and a second end opposite to the first end and distant from the light-emitting element, and a first distance from the first end of the inclined surface to the top side of the optical proximity sensor element is larger than a second distance from the second end of the inclined surface to the top side of the optical proximity sensor element.

8. The portable electronic device of claim 5, wherein a second projected light beam generated by the light-emitting element passes through the optical element and is reflected by an object above the optical element to form a second reflected light beam that is projected onto the inclined surface of the second exposed surface, and the second reflected light beam passes the inclined surface of the second exposed surface and is projected onto the light-sensing area of the optical proximity sensor element.

* * * * *